April 21, 1970     A. WICKERSHEIM     3,507,092

PACKAGING MACHINES

Original Filed Sept. 13, 1965

Inventor:
AUGUST WICKERSHEIM
BY
Stevens, Davis, Miller & Mosher
ATTORNEYS

United States Patent Office 3,507,092
Patented Apr. 21, 1970

3,507,092
PACKAGING MACHINES
August Wickersheim, 4 Industriestrasse,
Egenbuttel, near Hamburg, Germany
Original application Sept. 13, 1965, Ser. No. 486,992, now Patent No. 3,415,035, dated Dec. 10, 1968. Divided and this application June 18, 1968, Ser. No. 737,920
Claims priority, application Germany, Mar. 6, 1965, W 34,499; June 19, 1965, W 35,169
Int. Cl. B65b 61/00; B41f 3/44
U.S. Cl. 53—131                                      5 Claims

ABSTRACT OF THE DISCLOSURE

This invention relates to an apparatus for closuring a filled package and affixing thereto a tag. According to the invention the apparatus includes a closer head adapted to fasten a clamp about the packaging material at the neck of the filled package, and a device for printing indicia on strip material, severing from the printed-on strip material a length thereof, and feeding the severed length to the closer head such that it is inserted between the packaging material and the clamp to be applied, whereby when the clamp is fastened about the neck of the filled package the length of strip material is affixed thereto.

---

This is a division of application Ser. No. 486,992, filed Sept. 13, 1965, now Patent No. 3,415,035.

Preferably the device for printing on the strip material comprises a machine frame fixed to the closer head, in which frame is guided a movable U-shaped slide controlling the intermittent feed of the strip material, the arm ends of which slide carry printing blocks, in whose path of travel inking mechanisms controllable by the slide and printing cylinders for printing on the white and counter-printing movable by means of control members into the printing position, are arranged, which are applied on both sides of the strip material.

Figure 1:
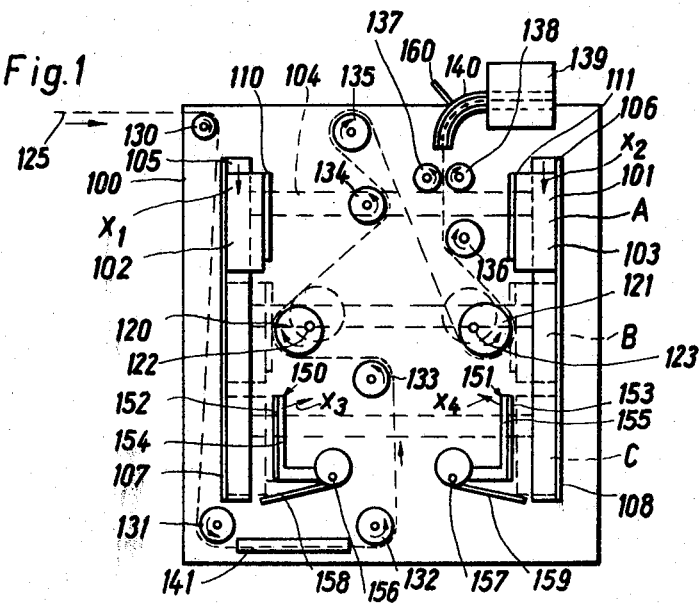
Figure 2:
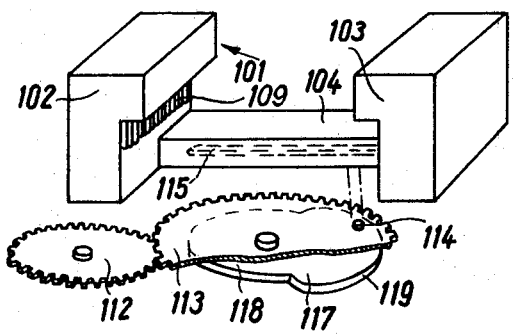
Figure 3:
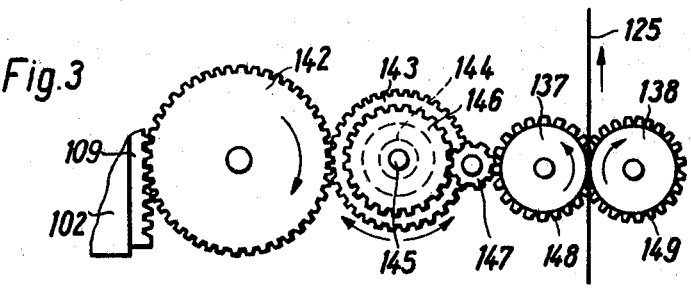

Apparatus embodying the present invention will now be described, by way of example with reference to the accompanying drawings, in which:

FIGURE 1 shows a device for printing strip material viewed from the front and showing different positions of the slide carrying the printing blocks, the closer head being shown diagrammatically, FIGURE 2 shows the slide and, partly broken away, its drive device in perspective, and FIGURE 3 represents the drive device for the feed rollers for the strip material viewed from the front.

The apparatus for closuring filled packages includes a closer head, represented diagrammatically at 139, and a device for printing indicia on strip material, severing from the printed-on strip material a length thereof, and feeding the severed length to the closer head. The apparatus also includes a drive arrangement (not shown in the drawings) for driving the working parts of the closer head and of the said device. The closer head will not be described in detail herein and may be of known design, or may be the closer head which is described in the specification of copending application Ser. No. 486,992 in combination with the device for printing on strip material described herein.

The closer head is adapted to fasten a clamp about the packaging material at the neck of a filled package in order to closure the package. With the closer head described in the above mentioned specification the "neck" between a filled package and a length of tubular packaging material is introduced by hand into the closer head where the clamp, constituted by a portion cut from a strip of metal, is fastened about the neck by a movable die cooperating with a stationary die. Simultaneously a further pair of dies fasten a second clamp, similarly formed, about the neck on the opposite side of the first-mentioned clamp to the filled package, and a knife then severs the packaging material between the two clamps. Thus the first-mentioned clamp serves to closure the filled package while the second clamp closes off the end of the tubular packaging material ready for filling the next package.

The device for printing on strip materials is fixed to the closer head 139 and consists of a baseplate 100, which forms the machine frame, and a U-shaped slide 101 guided on the baseplate 100. The arms of the slide 101 are designated as 102, 103 and the web connecting the arms together, as 104. The arrangement of the slide 101 in the baseplate 100 is such that the free ends of the arms 102, 103 of the slide 101 are guided in guide slots 105, 106 extending parallel to one another, while the web 104 connecting the arms 102, 103 is guided on the rear side of the baseplate 100. In the vicinity of the guide slots 105, 106 guide bars 107, 108 are also provided for guiding the slide 101.

The end of each of the arms 102, 103 projecting out of the guide slots 105, 106 carries on the surface facing the other arm a printing block 110, 111, which consists for lettering the strip material, of printing blocks produced from typeset material. The printing blocks may be made interchangeable.

The drive of the slide 101 is effected through a motor-driven gearwheel 112, which meshes with the teeth of a gearwheel 113. The gearwheel 113 carries on its disc surface an eccentrically arranged guide pin 114 which is guided in a guide slot 115 provided in the rear side surface of the web 104 of the slide 101. On the shaft of the gearwheel 113 is provided a cam 117 with cam surfaces 118 and 119 (FIGURE 2).

In the vicinity of the path of travel of the slide arms 102, 103 are arranged printing cylinders 120, 121 on the baseplate 100, whose shafts 122, 123 are eccentrically supported, which carry at their free ends (not shown in the drawing) cam followers. These cam followers are so guided on the cam surfaces 118, 119 of the cam 117 that, when the cam followers of the printing cylinders 120, 121 roll on the cam surface 119, the printing cylinders 120, 121 are passed into the printing position, i.e. into the swung-in position, while when the cam surface 118 comes into action, the printing cylinders 120, 121 are located in the position shown in dashed line in FIGURE 1.

The strip material to be printed is designated as 125. It is taken from a supply spool and guided over deflecting rollers 130, 131, 132, 133 to the printing cylinder 120 for the printing on the white. The strip material guided round the printing cylinder 120 is next guided over deflecting rollers 134, 135, to be then guided round the printing cylinder 121 for the counterprinting and led over a further deflecting roller 136 between conveyor rollers 137, 138 to the closer head 139, of the bag closer device. All the deflecting rollers 130 to 136 are preferably cantilevered on the baseplate 100.

Between conveyor rollers 137, 138 for the feed of the strip material 125 is provided an arcuate guide component 140, which ensures a satisfactory insertion of the strip material into the closer head 139. There may be provided along the guide path of the strip material 125 guide rails between the individual deflecting rollers, as shown at 141.

The drive of the conveyor rollers 137, 138 is controlled by the slide 101. For this purpose the arm 102 has a toothed gear rack 109 in whose teeth a gearwheel 142 engages, which is connected further with a gearwheel 143. The gearwheel 143 is provided with a free wheel of known construction, which is indicated at 144. One the shaft 145 of the gearwheel 143 is fixed a gearwheel 146, which is connected with a gearing consisting of the gearwheels 147, 148, 149, the teeth of which 148, 149 support the conveyor rollers 137, 138 (FIGURE 3).

Below the printing cylinders 120, 121 are provided parallel and adjacent to the guide path of the printing blocks 110, 111, inking mechanisms 150, 151. Each inking mechanism 150 or 151 consists of an angular support plate 154, 155 (carrying an inking pad 152 or 153 respectively) whose free angle arm end is fixed to a spring loaded cam 156 or 157 respectively, eccentrically supported on the baseplate 100. The cams 156, 157 each carry a control arm 158 or 159, which project into the path of travel of the free arm ends of the slide 101 and which are so arranged in relation to the support plates 154 and 155 that when the lower edges of the arms of the slide 101 impinge on the control arms 158, 159, the inking pads 152, 153 are brought to rest on the printing blocks 110, 111.

In front of the closer head 139 is arranged a separating knife 160 in the guide path of the strip material 125, which is so controlled by the closer head 139 that the strip material is always separated between two printed sections, when the free end of the strip section adjacent to the closer head is led in between the packaging material and the closure clamp before the latter is fastened about the material.

The device works as follows:

After switching on the drive motor and actuating a release lever, which may advantageously be coupled with a release lever of the closer head the slide 101 with the printing blocks 110, 111 is moved from the position A represented in FIGURE 1 in the direction of the arrow $X_1$, $X_2$ into the position C, after starting the drive motor and actuating the release lever. During the downward travel of the slide 101 the printing cylinders 120, 121 are drawn out of the path of travel of the printing block 110, 111, which is effected by means of the cam 117. In the retracted position of the printing cylinders 120, 121, no printing of the strip material 125 can take place. During the downward travel of the slide 101 the free-wheel 144 of the gearwheel 143 comes simultaneously into effect: the conveyor rollers 137, 138 for the forward feed of the strip material are not set in rotation.

Shortly before reaching the bottom dead center of the slide 101 its arms 102, 103 strike the control arms 158, 159 in such a way that the inking mechanisms 150, 151 are swivelled against the printing blocks 110, 111 and are brought to rest on these. In this way at each downward stroke of the slide 101 ink is applied on the printing blocks. During the upward movement of the slide 101 the inking mechanisms 150, 151 under spring pressure are swivelled out of the moistening position into the starting position, i.e. in the direction of the arrows $X_3$, $X_4$ (FIGURE 1).

During the upward movement of the slide 101 into the position B the printing cylinders 120, 121 are moved by the cam 117 into the printing position. At the same time the strip material is intermitently moved forward by means of the conveyor rollers 137, 138 driven through the gearing 142, 143, 146, 147, 148, 149.

By the travel of the printing blocks 110, 111 past the printing cylinders 121, 120 and by the simultaneous drawing of the strip material between the printing blocks 110, 111 and the printing cylinders 120, 121, a more uniform and sharper pressure is obtained. The strip material guided round the printing cylinder 120 is printed on one side by means of the printing block 110, and the material guided round the printing cylinder 121 is printed on the other side by means of the printing block 111. Due to the deflecting rollers 134, 135 over which the strip material 125 is guided between the two printing cylinders 120, 121, in the vicinity of the printing cylinder 121 the still unprinted strip side is available for the counter printing. The distance between the printing cylinders 120, 121 is given such a dimension that the imprint of the strip material is already dry before the guiding round the cylinder 121. From the printing position (position B) the slide 101 is in each case guided back into the starting position in A. The downward travel of the slide 101 then begins anew.

The step-up or step-down ratio of the gearing for the drive of the conveyor rollers 137, 138 is so selected that the strip material 125 is conveyed intermittently. The forward feed of the strip material is always effected when the printing blocks 110, 111 are moved past the printing cylinders 129, 121 moved into the printing position. The guide path of the strip material 125 between the printing cylinders 120, 121 is here given such a dimension that the counter-printing is applied in the same strip section which already carries the first printing on white.

The already printed strip material is fed by means of the conveyor rollers 137, 138 to the closer head 139. The individual printed strip sections are separated from one another by means of the separating knife 160, which is likewise controlled by the closer head 139. The control of the slide 101 and the control of the conveyors rollers 137, 138 for the strip material 125 are preferably initiated from the drive of the closer device so that in each case a printed strip section is fed to the closer head and is inserted between the packaging material and the closure clamp substantially parallel to the axis of the packaging material shortly before the clamp is clamped round the neck between the filled package and unfilled packaging material.

The device for printing strip material hereinbefore described makes possible the bilateral printing of a strip and an intermittent feed of the printed strip into the closer head of the closure device with adaptation to the particular closure process, so that even at a high operational speed of the closer device a clean printing of the strip material and a secure insertion of the printed strip section into the closer head is ensured. As the printing blocks of the slide during its downward travel actuate inking mechanisms, the printing blocks are renewedly moistened after each printing process, so that even when using strip material of different materials a uniformly good imprint is obtained. The strip to be printed may consist of synthetic plastics material, of paper, of paper inlaid with threads, or of cotton. The inking composition of the inking mechanism is then selected to suit the strip material used. As printing blocks, rubber printing blocks may be used, which are provided on their reverse side with a bilaterally self adhesive foil, so that a trouble-free and rapid exchange of the printing blocks is made possible. As the printing blocks and the strip material to be printed are moved parallel to one another into the printing position, a clean imprint on the strip material is obtained.

What I claim is:

1. An apparatus for closuring a filled package, including a closer head and a device for printing indicia on strip material and severing from the printed-on strip material a length thereof, the device for printing the strip material comprising: a machine frame fixed to the closer head; a movable U-shaped slide, guided by said frame, for controlling the intermittent feed of the strip material; arm ends of said slide; printing blocks carried by said arm ends; inking mechanisms in the path of travel of said printing blocks and controllable by the slide; and printing cylinders for printing on respective sides of the strip material, which cylinders are movable by means of control members into and out of the printing position.

2. An apparatus as claimed on claim 1, characterised in that the printing blocks are arranged at opposite inner surfaces of the arms of the slide and the web connecting the arms of the slide, has on the rear side a guide groove for the engagement of a guide pin which is arranged eccentrically on a drive disc, which carries on its rear side a cam for the positioning of the printing cylinder.

3. An apparatus as claimed in claim 2, characterised in that for the intermittent feed of the strip material guided over the printing cylinders, an arm of the slide is provided with a gear rack, in which a gearwheel engages, which is connected with a gearwheel with a freewheel, whose shaft carries a gearwheel for the drive of strip conveyor rollers.

4. An apparatus as claimed in claim 3, characterised in that each inking mechanism consists of a pad carrying the inking composition, which is fixed to a spring-loaded eccentrically supported cam and a control arm is arranged in the path of movement of the slide and engageable by same, said ink pad being applied to the printing block responsive to actuation of the control arm.

5. An apparatus as claimed in claim 4, characterised in that for separating the printed strip sections a separating knife controlled by the closer head is provided in the path of movement of the printed strip material.

References Cited

UNITED STATES PATENTS

| 888,384 | 5/1908 | Bechman | 101—190 |
| 2,654,495 | 10/1953 | Meyer | 156—521 X |
| 3,000,155 | 9/1961 | Gausman | 53—137 |
| 3,375,634 | 4/1968 | Jarund | 53—14 |

FOREIGN PATENTS

| 1,184,267 | 12/1964 | Germany. |

THERON E. CONDON, Primary Examiner

N. ABRAMS, Assistant Examiner

U.S. Cl. X.R.

101—254